(12) United States Patent
Urita et al.

(10) Patent No.: US 6,999,394 B2
(45) Date of Patent: Feb. 14, 2006

(54) OPTICAL DISC PLAYBACK APPARATUS

(75) Inventors: Kouichi Urita, Saijo (JP); Youichi Ogura, Saijo (JP); Shinichiro Sato, Saijo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 644 days.

(21) Appl. No.: 10/196,381

(22) Filed: Jul. 17, 2002

(65) Prior Publication Data

US 2003/0016606 A1    Jan. 23, 2003

(30) Foreign Application Priority Data

Jul. 18, 2001  (JP)  .............................. 2001-217499

(51) Int. Cl.
*G11B 7/00*    (2006.01)

(52) U.S. Cl. .............................. 369/59.21; 360/59.15; 360/59.23; 360/65; 360/47.25

(58) Field of Classification Search ............ 369/47.25, 369/59.15, 59.16, 59.21, 59.2, 59.22, 59.24, 369/59.23, 47.26
See application file for complete search history.

(56) References Cited

U.S. PATENT DOCUMENTS

| 6,385,239 B1 * | 5/2002 | Okamoto et al. ........... 375/232 |
| 6,587,410 B1 * | 7/2003 | Suzuki et al. ............. 369/47.28 |
| 6,724,706 B1 * | 4/2004 | Nakajima et al. ......... 369/59.23 |
| 6,836,511 B1 | 12/2004 | Marukawa |

FOREIGN PATENT DOCUMENTS

| JP | 5-120798 | 5/1993 |
| JP | 7-99426 | 4/1995 |
| JP | 09320198 A | * 12/1997 |
| JP | 10-64068 | 3/1998 |
| JP | 10290145 | 10/1998 |
| JP | 11-16279 | 1/1999 |
| JP | 11016279 A | * 1/1999 |
| JP | 2000-123487 | 4/2000 |
| JP | 2000123487 A | * 4/2000 |
| JP | 2000222824 A | * 8/2000 |
| JP | 2000311442 A | * 11/2000 |

OTHER PUBLICATIONS

English translation of 10-064068(JP).*
English translation of JP 5-120 798.*
English translation of JP 7-099426.*

* cited by examiner

*Primary Examiner*—W. R. Young
*Assistant Examiner*—Jorge L. Ortiz-Criado
(74) *Attorney, Agent, or Firm*—Wenderoth, Lind & Ponack, L.L.P.

(57) ABSTRACT

An optical disc playback apparatus that performs appropriate waveform equalization according to a difference in characteristics of reproduced signals between land parts and groove parts in an optical disc to which high-density recording is performed using a land/groove recording method. The optical disc playback apparatus includes a reproduction device, an A/D conversion circuit for sampling a reproduced signal to be converted into a multi-bit digital signal, a filter for subjecting the multi-bit digital signal to digital equalization, a filter coefficient learning device for adaptively controlling filter coefficients for the filter corresponding to the land part and the groove part to minimize an equalization error, and a switch signal generation device for generating a signal for switching between land and groove, thereby changing the filter coefficient adaptively to the land or the groove.

3 Claims, 8 Drawing Sheets

OPTICAL DISC PLAYBACK APPARATUS

FIELD OF THE INVENTION

The present invention relates to an optical disc playback apparatus and, more particularly, to an optical disc playback apparatus having a means for playing back an optical disc on which data are recorded in both of a land part and a groove part, which can improve the quality of an equalized signal regardless of a difference in characteristics of reproduced signals between the land part and the groove part, with the aim of performing higher-density recording.

BACKGROUND OF THE INVENTION

Conventionally, as described in Japanese Published Patent Application No. 2000-123487, a filter coefficient update means in an optical disc playback apparatus takes a difference between a provisional data judgement output that is obtained from a provisional judge unit and an output signal that is equalized by a filter, as an equalization error signal, and updates a filter coefficient so as to minimize an average of squares of the equalization error signal to improve the quality of the equalized signal.

Figure 9:
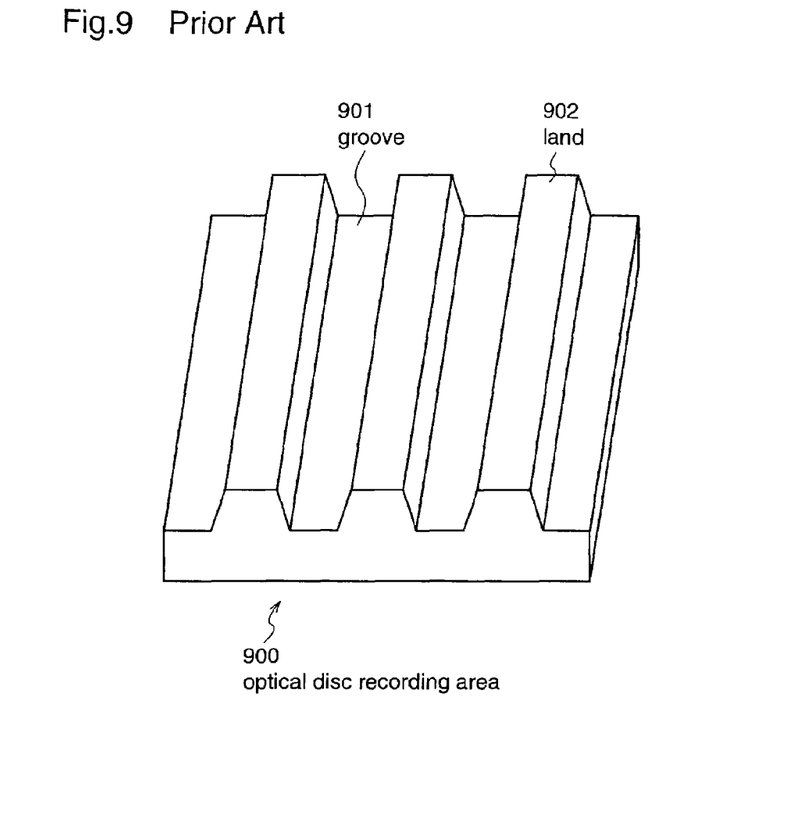
FIG. 9 is a diagram illustrating an optical disc recording area, for explaining problems in a prior art optical disc playback apparatus.

However, in recent years, as the amount of information is increased, demand for higher-density recording is growing in optical discs, and a land/groove recording method is employed by which information is recorded in both of grooves 901 which are arranged in a recording area 900 of an optical disc, and lands 902 between the grooves, as shown in FIG. 9. As seen from the figure, there is a difference in physical height between the groove part 901 and the land part 902. Therefore, characteristics of reproduced signals corresponding to recorded data vary due to differences in reflected lights. Accordingly, the conventional technique including only one filter coefficient learning means for controlling a filter that performs digital equalization to minimize the equalization error cannot handle the difference in characteristics of the reproduced signals between the groove part 901 and the land part 902.

When an optical disc on which data are recorded according to the land/groove recording method is played back, the conventional optical disc playback apparatus that is constructed as described above cannot accurately control the difference in characteristics of the reproduced signals, resulting from the difference in reflected lights.

SUMMARY OF THE INVENTION

The present invention has for its object to provide an optical disc playback apparatus which can perform appropriate waveform equalization adaptively to a difference in characteristics of reproduced signals between land parts and groove parts in an optical disc to which higher-density recording is carried out and the land/groove recording method is applied.

Other objects and advantages of the present invention will become apparent from the detailed description and specific embodiments described are provided only for illustration since various additions and modifications within the spirit and scope of the invention will be apparent to those of skill in the art from the detailed description.

According to a 1st aspect of the present invention, there is provided an optical disc playback apparatus comprising: a reproduction means for reproducing information that is recorded in a land part and a groove part on an optical disc; a filter for subjecting a multi-bit digital signal that is obtained by an A/D converter by converting a reproduced signal that has been obtained by the reproduction means, to digital equalization with varying a filter coefficient; a switch signal generation means for recognizing the land part and the groove part to generate a switch signal; and a filter coefficient learning means for adaptively controlling the filter coefficient that is inputted to the filter, for minimizing an equalization error in each of the land part and the groove part. Therefore, filter coefficients which are satisfactory at the land part and at the groove part, respectively, can be always set in the filter, thereby improving the quality of equalized signals.

According to a 2nd aspect of the present invention, in the optical disc playback apparatus of the 1st aspect, the filter is an acyclic filter, and comprises: plural delay elements for delaying the multi-bit digital signal which has been obtained by the A/D converter, at predetermined intervals; plural multipliers which are provided adaptively to the delay elements, respectively, each multiplier receiving the multi-bit digital signal or an output of the respective delay element as a first input, receiving a filter coefficient which has been controlled by the filter coefficient learning means as a second input, and multiplying the first input by the second input; and an addition means for adding outputs from the plural multipliers. Therefore, filter coefficients which are satisfactory at the land part and at the groove part, respectively, can be always set in the filter, thereby improving the quality of equalized signals.

According to a 3rd aspect of the present invention, in the optical disc playback apparatus of the 1st aspect, the filter coefficient learning means comprises: a provisional judge means for setting an equalization target value in accordance with an output signal from the filter; an equalization error detection means for detecting an equalization error on the basis of the equalization target value that is set by the provisional judge means and the output signal of the filter; a correlation unit for operating a correlation between the equalization error that is obtained by the equalization error detection means and the output signal of the filter; a feedback gain adjust means for adjusting a feedback gain that is outputted from the correlation unit; and a filter coefficient update means for updating the filter coefficient adaptively to the land part and the groove part, respectively, by using the output signal from the feedback gain adjust means and the switch signal generated by the switch signal generation means. Therefore, filter coefficients which are satisfactory at the land part and at the groove part, respectively, can be always set in the filter, thereby improving the quality of equalized signals.

According to a 4th aspect of the present invention, in the optical disc playback apparatus of the 3rd aspect, the filter coefficient update means comprises: plural registers which are provided adaptively to respective filter coefficients, each register storing an initial value for the land part or the groove part; first selectors which are provided adaptively to the plural registers, respectively, each selector selecting one of outputs from the registers in accordance with the switch signal generated by the switch signal generation means, to output the initial value for the land part or the groove part; integration means which are provided adaptively to the respective filter coefficients, each integration means integrating the output signal of the feedback gain adjust means; and second selectors which are provided adaptively to the respective filter coefficients, each selector selecting an output from the integration means or the output from the first selector to output a selected output as a filter coefficient. Therefore, filter coefficients which are satisfactory at the land part and at the groove part, respectively, can be always set in the filter, thereby improving the quality of equalized signals.

According to a 5th aspect of the present invention, the optical disc playback apparatus of the 4th aspect comprises: holding registers which can hold a value, respectively, being provided in pair with the respective register; and third selectors each receiving an output from the holding register and an output from the normal register, which registers are provided in pair, and selecting one of the signals from the holding register and the normal register in accordance with the switch signal, to output a selected signal. Therefore, it is possible to perform learning of a filter coefficient with employing at its initial value the filter coefficient which has been learned at the previous land reproduction or groove reproduction, thereby realizing an appropriate digital equalization starting from when the switching between the land part and the groove part has been carried out.

DETAILED DESCRIPTION OF THE PREFERRED EMBODIMENTS

Hereinafter, embodiments of the present invention will be described with reference to the drawings.

[Embodiment 1]

A first embodiment of an optical disc playback apparatus of the present invention will be described with reference to FIGS. 1 to 5.

Figure 1:
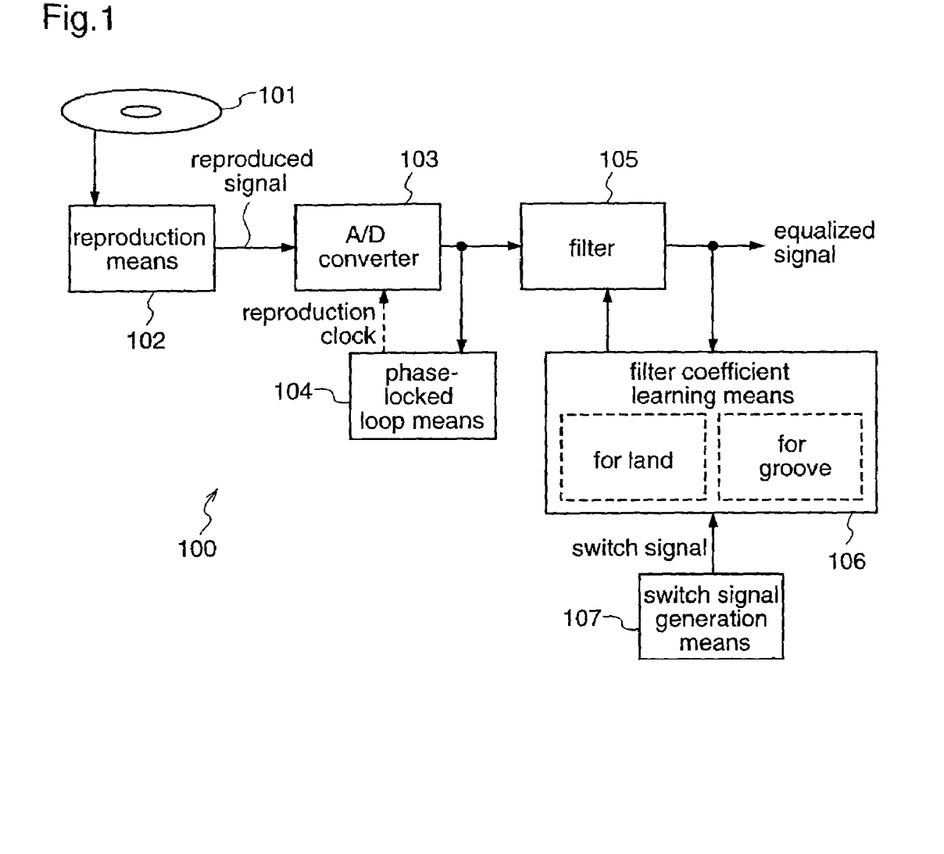
FIG. 1 is a block diagram illustrating a structure of an optical disc playback apparatus according to a first embodiment of the present invention.

FIG. 1 is a block diagram illustrating a structure of an optical disc playback apparatus 100 according to a first embodiment of the present invention. This optical disc playback apparatus 100 includes filter coefficient learning means for reproduced signals corresponding to a land part and a groove part, respectively, which signals are obtained by playing back an optical disc to which the land/groove recording method is applied, thereby setting filter coefficients which are always satisfactory at the land part and at the groove part, respectively, in a filter to improve the quality of equalized signals.

The optical disc playback apparatus 100 includes, as shown in FIG. 1, a reproduction means 102 for reproducing information that is recorded on an optical disc 101; an analog-to-digital converter (A/D converter) 103 for sampling a reproduced signal that is obtained by the reproduction means 102 to be converted into a multi-bit digital signal; a phase-locked loop means 104 for performing control to output a reproduction clock from an oscillator, which clock is in phase with a clock component included in the reproduced signal that is obtained by the reproduction means 102; a filter 105 for subjecting the digital signal that is obtained by the sampling of the A/D converter 103 to digital equalization; a filter coefficient learning means 106 for controlling a filter coefficient of the filter 105 adaptively to the land part and the groove part to minimize an equalization error; and a switch signal generation means 107 for generating a switch signal for switching between the land part and the groove part in the filter coefficient learning means 106.

Hereinafter, the respective components constituting the optical disc playback apparatus 100 in FIG. 1 will be described in more detail.

The A/D converter 103 samples a reproduced signal that is obtained by the reproduction means 102 to be converted into a multi-bit digital signal, by making a clock component included in the reproduced signal be in phase with a reproduction clock that is outputted from the oscillator in the phase-locked loop means 104.

Figure 2:
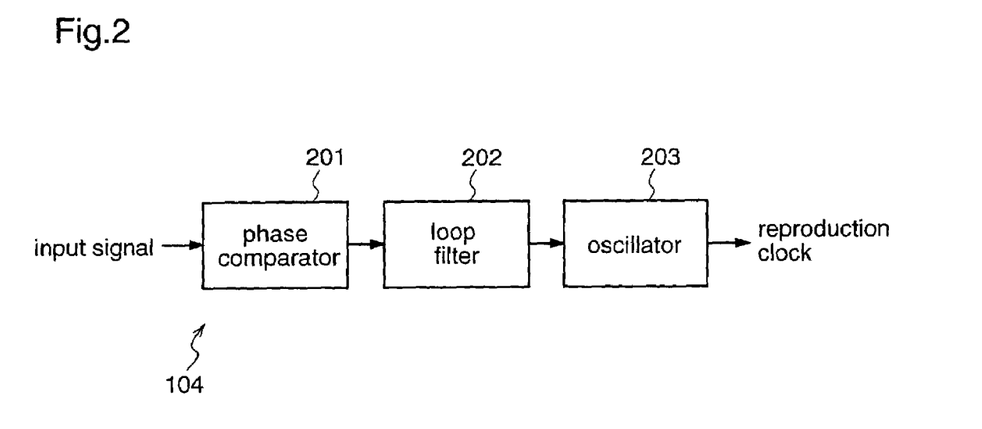
FIG. 2 is a block diagram illustrating a structure of a phase-locked loop means which is a component of the optical disc playback apparatus.

The phase-locked loop means 104, as shown in FIG. 2, includes a phase comparator 201 for detecting a phase difference in the signal outputted from the A/D converter 103; a loop filter 202 for smoothing a phase difference signal that is outputted from the phase comparator 201; and an oscillator 203 for outputting a reproduction clock. The phase-locked loop means 104 can control the phase of the reproduction clock that is outputted from the oscillator 203 to be in phase with a clock component of a signal that is outputted from the A/D converter 103. Accordingly, the output signal of the A/D converter 103 can be in phase with the clock component included in the reproduced signal that has been obtained by the reproduction means 102, and be sampled to be converted into a multi-bit digital signal.

Figure 3:
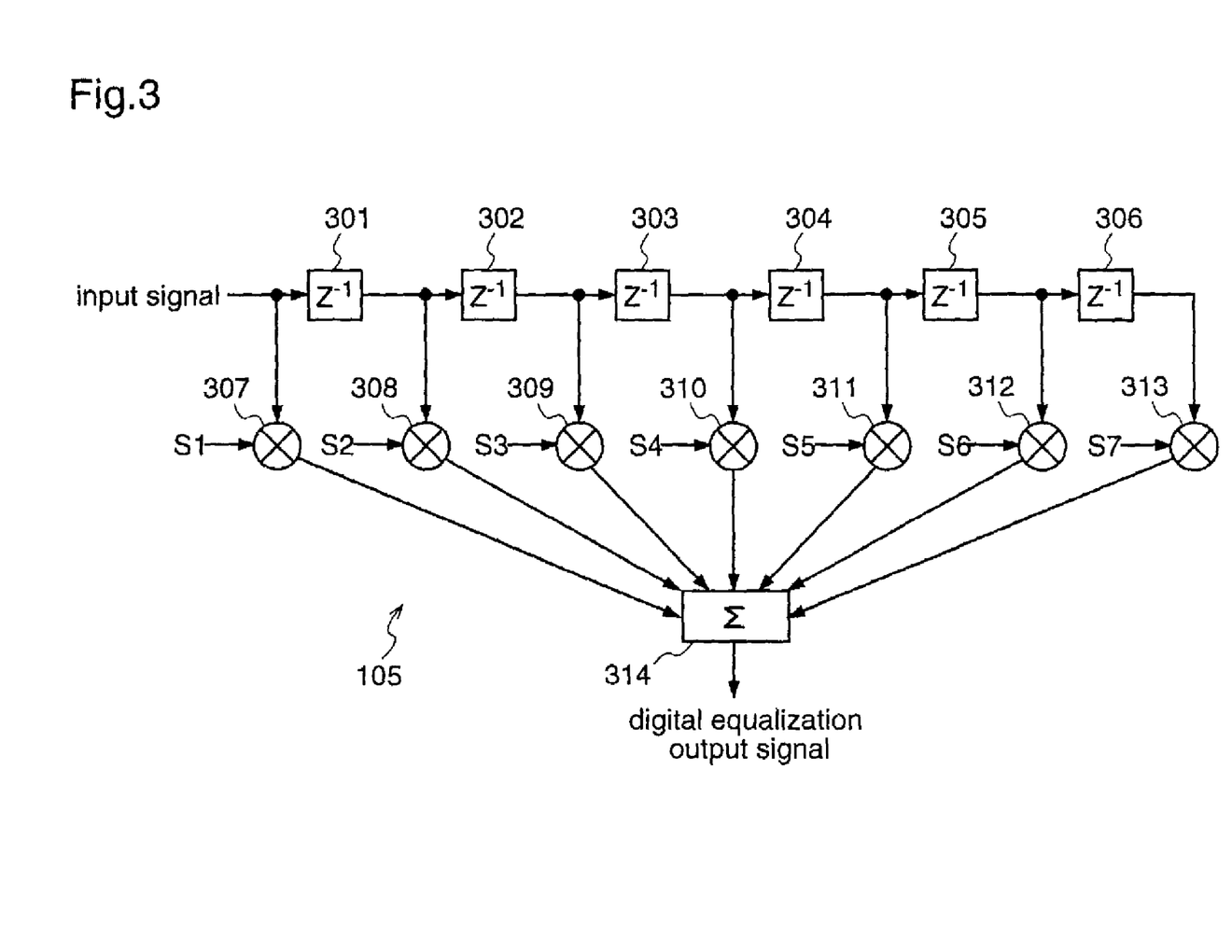
FIG. 3 is a diagram illustrating a structure of an FIR filter which is a component of the optical disc playback apparatus.

The filter 105 is constituted by finite taps, and is a FIR filter (Finite Impulse Response filter), for example. Equalization characteristics of the FIR filter can be realized by varying a tap weighting factor (hereinafter, referred to as a filter coefficient). For example, a FIR filter including seven taps is constituted, as shown in FIG. 3, by delay elements 301 to 306 for delaying a signal, multiplication elements 307 to 313, and an addition means 314. The filter coefficients S1 to S7 of the FIR filter are adaptively controlled by the filter coefficient learning means 106 to minimize an equalization error, thereby adaptively equalizing the output signal of the A/D converter 103.

Figure 4:
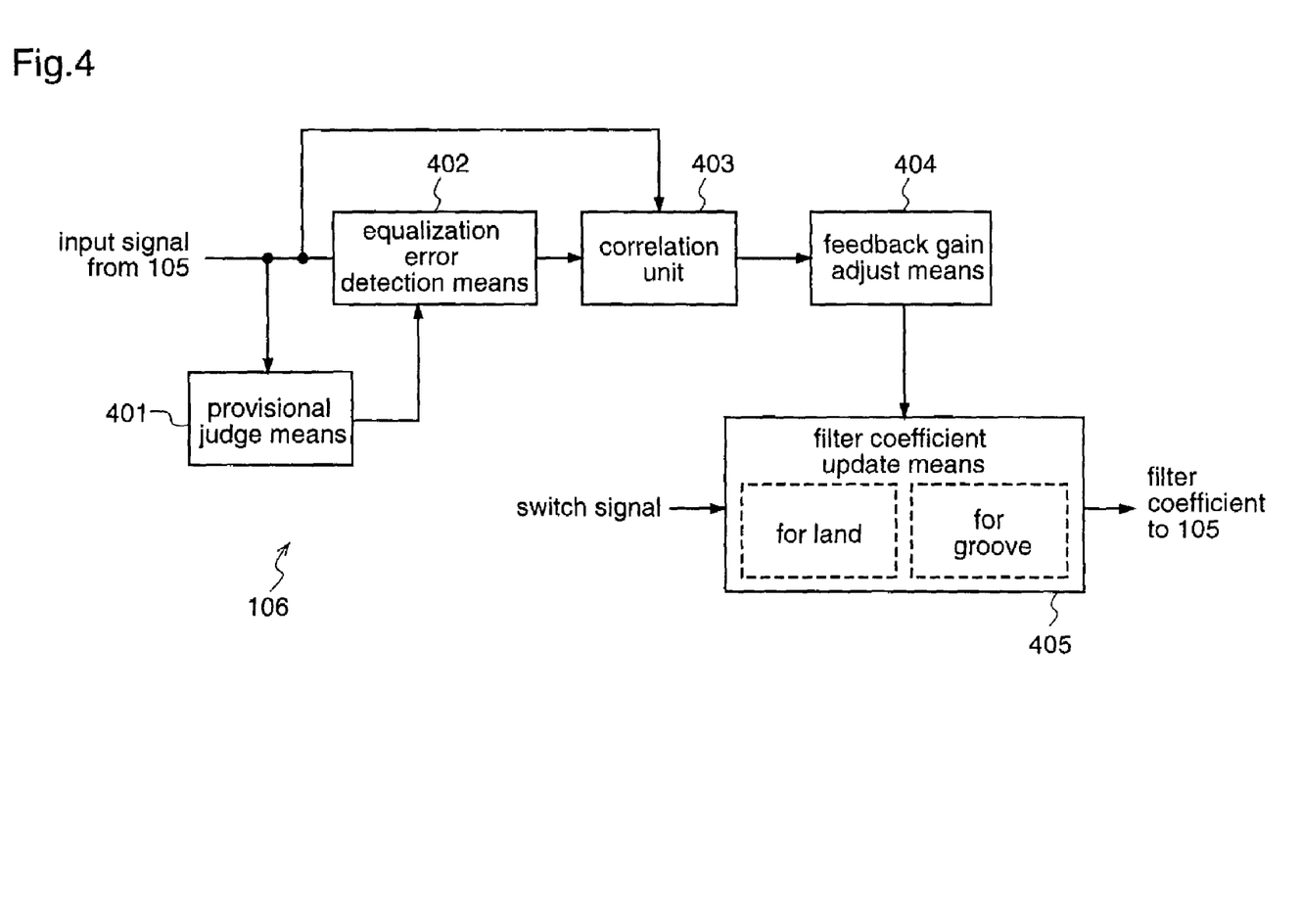
FIG. 4 is a block diagram illustrating a specific structure of a filter coefficient learning means which is a component of the optical disc playback apparatus.

The filter coefficient learning means 106 learns filter coefficients by using LMS (Least Mean Square) algorithm for adaptively performing control to minimize the equalization error, and switches between a filter coefficient at the land part reproduction and a filter coefficient at the groove part reproduction in accordance with a switch signal that is generated by the switch signal generation means 107, to output the selected filter coefficient. This filter coefficient learning means 106 is constituted, as shown in FIG. 4, by a provisional judge means 401 for receiving an output from the filter 105 as an input signal, and detecting an equalization target value from the input signal, an equalization error detection means 402 for detecting an equalization error on the basis of the equalization target value and the input signal, a correlation unit 403 for operating a correlation between an output signal from the equalization error detection means 402 and the input signal, a feedback gain adjust means 404 for adjusting a feedback gain of an output signal from the correlation unit 403, and a filter coefficient update means 405 for updating respective filter coefficients for the land part and the groove part, in accordance with a switch signal for switching between land and groove, to output updated filter coefficients.

Figure 5:
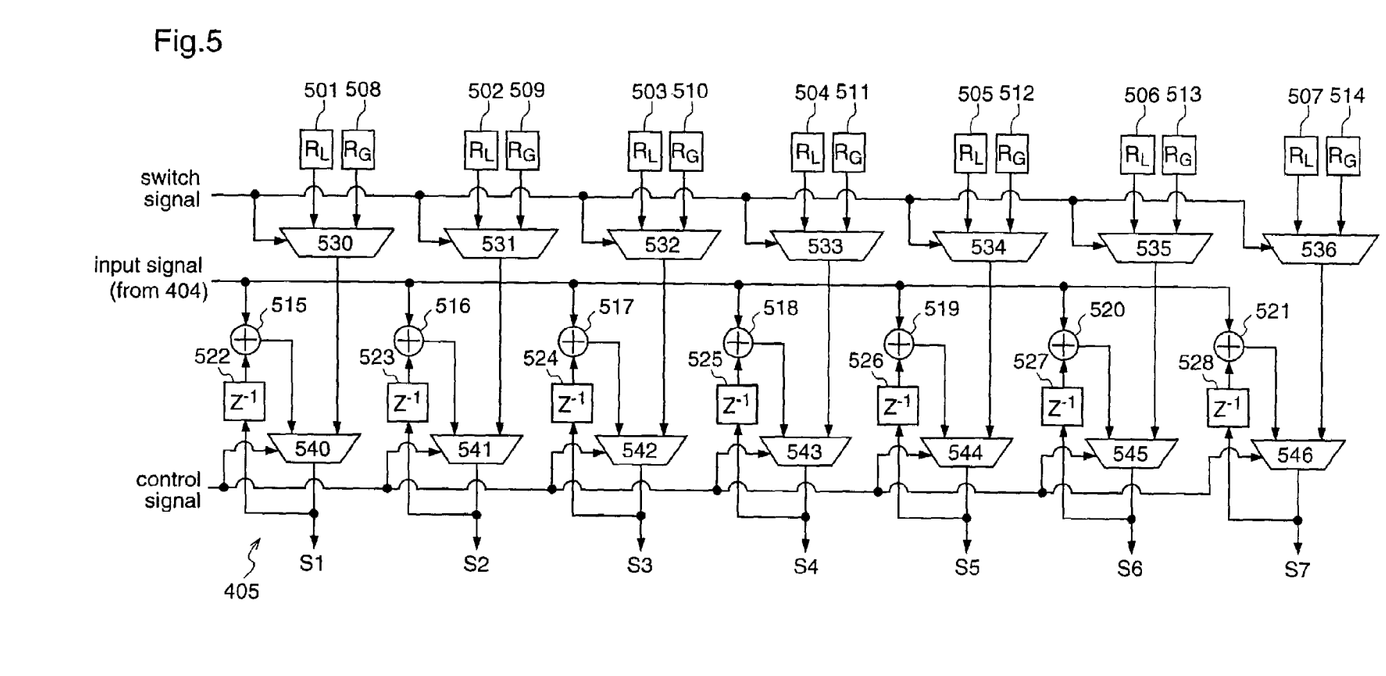
FIG. 5 is a diagram illustrating a structure of a filter coefficient update means which is a component of the filter coefficient learning means.

The filter coefficient update means 405 will be described in more detail with reference to FIG. 5. In FIG. 5, registers 501 to 507 are registers each storing an initial value of a filter coefficient for the land part, and registers 508 to 514 are registers each storing an initial value of a filter coefficient for the groove part. The switch signal for switching between the land and the groove is inputted to selectors 530 to 536 (first selectors), and the initial value of the filter coefficient for land part or the groove part is outputted in accordance with the switch signal.

Further, the output signal of the feedback gain adjust means 404 and a filter coefficient of each tap are added by using each of addition elements 515 to 521 that constitute an integration means, to output a learned coefficient, thereby updating the respective filter coefficient.

Here, the delay elements 522 to 528 each adjust the time of the respective filter coefficient that is added to the input signal. Further, a control signal controls respective selectors 540 to 546 (second selectors) for selecting the initial value of the filter coefficient as it is, or the learned filter coefficient. For example, the control is performed for outputting the initial value of the filter coefficient only at the beginning of the learning and thereafter outputting the learned filter coefficient, or continuing to output the initial value of the filter coefficient without performing the learning.

The switch signal generation means 107 generates a switch signal for distinguishing between the land part reproduction and the groove part reproduction, and for example generates a gate signal that is "Hi" at the land part reproduction and "Low" at the groove part reproduction.

As described above, the optical disc playback apparatus is provided with the filter coefficient learning means 106 for storing appropriate filter coefficients corresponding to different characteristics of the reproduced signals at the land part reproduction time and the groove part reproduction time, respectively, and the two filter coefficients are switched in accordance with the signal outputted from the switch signal generation means 107. Therefore, satisfactory filter coefficients can be always set in the filter 105, thereby improving the quality of the equalized signals.

[Embodiment 2]

Figure 6:
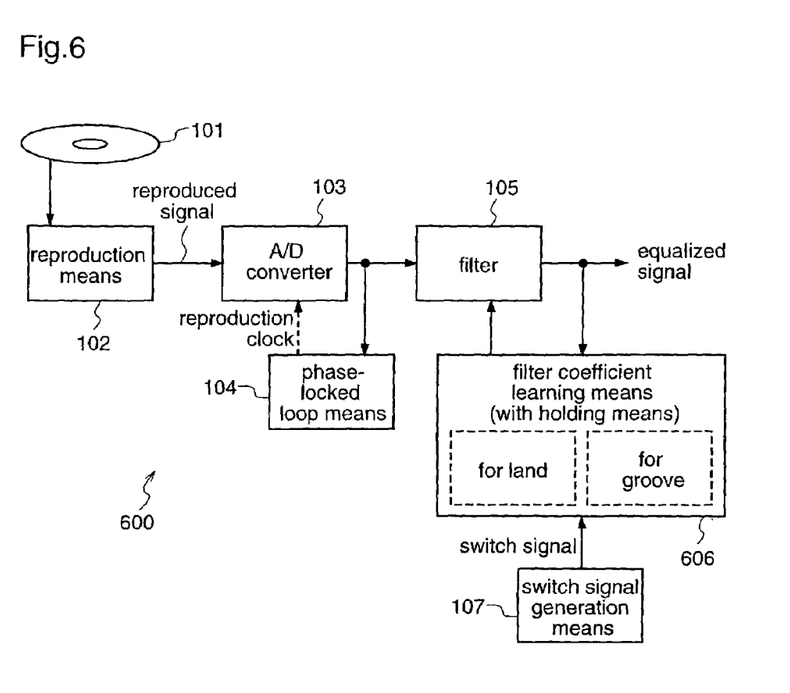
FIG. 6 is a block diagram illustrating a structure of an optical disc playback apparatus according to a second embodiment of the present invention.

An optical disc playback apparatus of a second embodiment will be described with reference to FIGS. 6 to 8. FIG. 6 is a block diagram illustrating a structure of an optical disk playback apparatus 600 according to the second embodiment. The same reference numerals as those in FIG. 1 denote the same or corresponding elements. This optical disc playback apparatus 600 includes filter coefficient learning means for reproduced signals corresponding to the land part and the groove part, which signals are obtained by playing back an optical disc to which the land/groove recording method is applied, thereby always setting filter coefficients which are satisfactory at the land part and at the groove part, respectively, in the filter, whereby the quality of equalized signals can be improved, like the above-mentioned optical disc playback apparatus 100. This optical disc playback apparatus 600 is different from the apparatus 100 according to the first embodiment in that it employs a filter coefficient learning means with holding means 606.

Figure 7:
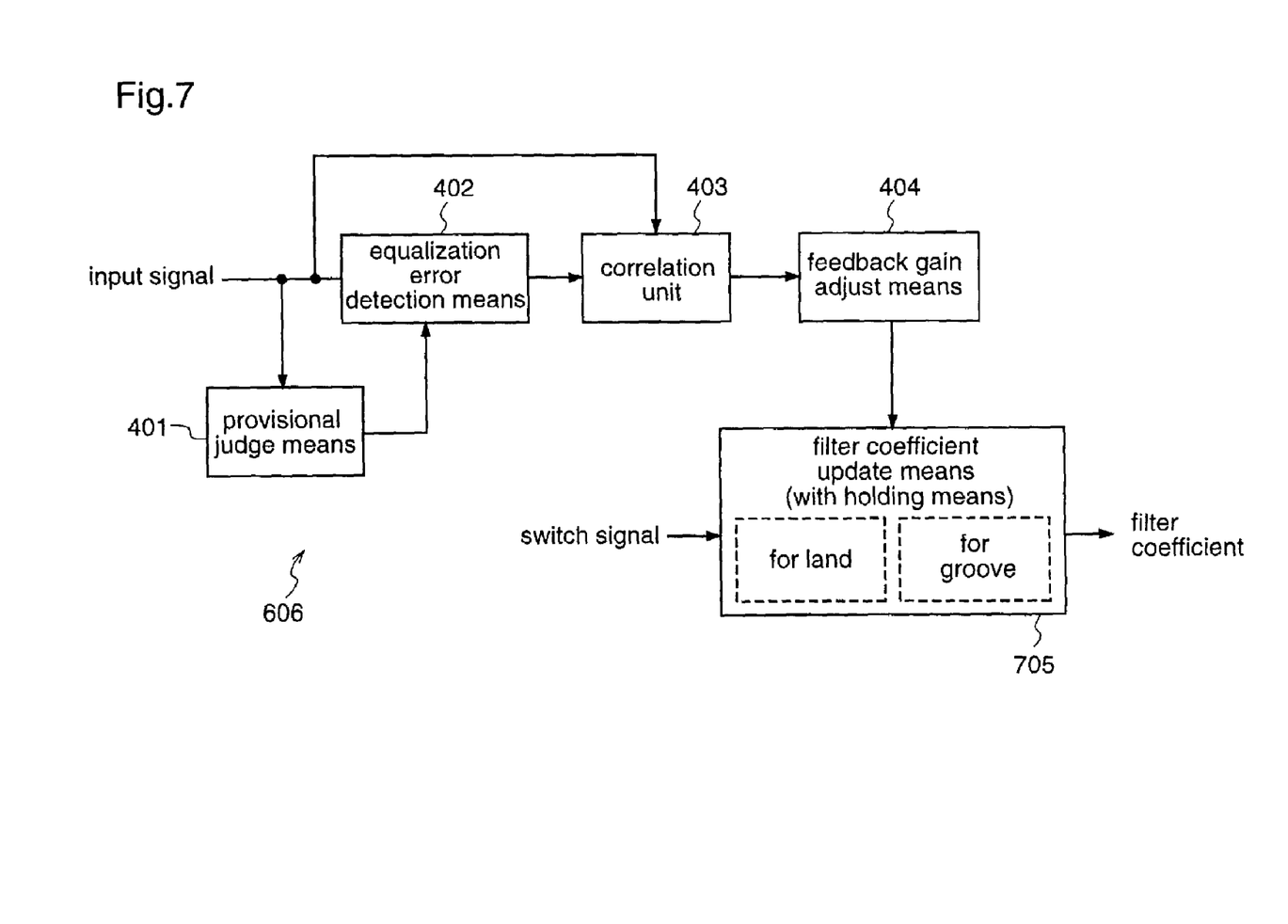
FIG. 7 is a block diagram illustrating a structure of a filter coefficient learning means in the optical disc playback apparatus according to the second embodiment.
Figure 8:
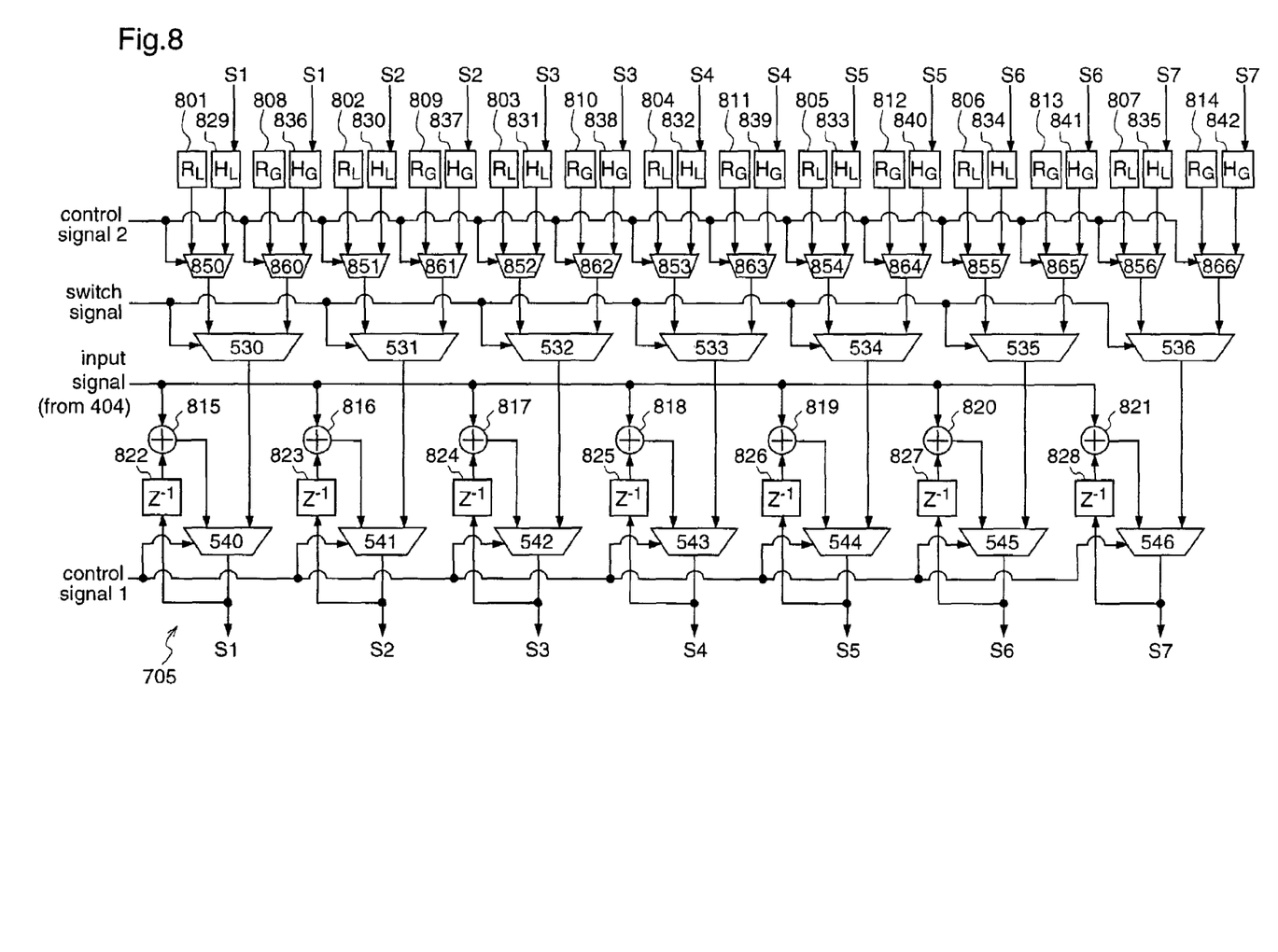
FIG. 8 is a diagram illustrating a structure of a filter coefficient update means which is a component of the filter coefficient learning means in the optical disc playback apparatus according to the second embodiment.

The filter coefficient learning means with holding means 606 includes, as shown in FIG. 7, a holding means for holding a filter coefficient value. The means 606 includes a filter coefficient update means with holding means 705 for updating respective filter coefficients for the land part and the groove part in accordance with the switch signal for switching between land and groove, and outputting updated filter coefficients. The same reference numerals as those in FIG. 4 denote the same or corresponding element.

The operation of the filter coefficient update means 705 which is a component of the filter coefficient learning means 606 will be described with reference to FIG. 8. In FIG. 8, registers 801 to 807 are registers each storing an initial value of a filter coefficient for the land part, and registers 808 to 814 are registers each storing an initial value of a filter coefficient for the groove part. Further, holding registers 829 to 835 are registers each holding a filter coefficient for the land part, and holding registers 836 to 842 are registers each holding a filter coefficient for the groove part.

A control signal 2 is inputted to selector 850 to 856 and 860 to 866 (third selectors) to select one of the usual filter and a holding filter. Then, the selected filter outputs the initial value of the filter coefficient or the learned filter coefficient.

Next, the selectors 530 to 536 are controlled by the switch signal for switching between land and groove, to select the filter coefficient for the land part or the filter coefficient for the groove part. Further, an output signal of the feedback gain adjust means 404 is added to the filter coefficient of each tap by using each of addition elements 815 to 821, to output a learned filter coefficient, thereby updating the filter coefficient.

Here, delay elements 822 to 828 each adjusts the timing of the filter coefficient that is added to the input signal. A control signal 1 controls selectors 540 to 546 for outputting the value selected in accordance with the control signal 2 as a filter coefficient, or outputting the learned filter coefficient.

Further, in accordance with the switch signal for switching between land and groove, the filter coefficient is held in the holding registers for the land part 829 to 835 at the learning of the land part filter coefficient, and held in the holding registers for the groove part 836 to 842 at the learning of the groove part filter coefficient.

Thus, in accordance with the control signal 1, the control signal 2, and the switch signal for switching between land and groove, the filter coefficients for the land part are learned and then the learned filter coefficients are held in the holding registers for land part 829 to 835 at the land part reproduction, and the filter coefficients which are held in the holding registers for the land part 829 to 835 are not updated at the subsequent groove reproduction, to be used as the initial value at the next land reproduction. Similarly, the filter coefficients for the groove part are learned and then the learned filter coefficients are held in the holding registers for groove part 836 to 842 at the groove part reproduction, and the filter coefficients which are held in the holding registers for groove part 836 to 842 are not updated at the subsequent land reproduction, to be used as the initial values for the next groove reproduction.

As described above, according to the second embodiment, the filter coefficient learning means 606 includes the holding registers 829 to 835 each holding the filter coefficient for the land part, and the holding registers 836 to 842 each holding the filter coefficient for the groove part, and one of the usual filter and the holding filter is selected by the selectors 850 to 856 and 860 to 866 in accordance with the control signal 2. Therefore, the learning of the filter coefficients can be performed with using the filter coefficient which has been learned at the previous land reproduction or groove reproduction as the initial value, depending on the difference in characteristics of reproduced signals between the land part reproduction and the groove part reproduction, whereby appropriate digital equalization can be performed starting from an instant at which the land and the groove are switched.

What is claimed is:

1. An optical disc playback apparatus comprising:
   a reproduction means for reproducing information that is recorded in a land part and a groove part on an optical disc;
   a filter for subjecting a multi-bit digital signal, which is obtained by an A/D converter by converting a reproduced signal that has been obtained by the reproduction means, to digital equalization with varying a filter coefficient;
   a switch signal generation means for recognizing the land part and the groove part to generate a switch signal; and
   a filter coefficient learning means for adaptively controlling the filter coefficient that is inputted to the filter, for minimizing an equalization error in each of the land part and the groove part, wherein the filter coefficient learning means comprises:
   a provisional judge means for setting an equalization target value in accordance with an output signal from the filter;
   an equalization error detection means for detecting an equalization error on the basis of the equalization target value and the output signal of the filter;
   a correlation unit for operating a correlation between the equalization error and the output signal of the filter;
   a feedback gain adjust means for adjusting a feedback gain, which is outputted from the correlation unit; and
   a filter coefficient update means for updating the filter coefficient adaptively to the land part and the groove part, respectively, by using the output signal from the feedback gain adjust means and the switch signal generated by the switch signal generation means;
   wherein the filter coefficient update means comprises:
   plural initial-value registers which are provided adaptively to respective filter coefficients, each initial-value register storing an initial value for the land part or the groove part;
   first selectors which are provided adaptively to the plural initial-value registers, respectively, each selector selecting one of the outputs from the initial-value registers in accordance with the switch signal generated by the switch signal generation means, to output the initial value for the land part or the groove part;
   integration means which are provided adaptively to the respective filter coefficients, each integration means integrating the output signal of the feedback gain adjust means; and
   second selectors which are provided adaptively to the respective filter coefficients, each second selector selecting an output from the integration means or the output from the first selector to output a selected output as a filter coefficient.

2. The optical disc playback apparatus of claim 1 wherein the filter is an acyclic filter, and comprises:
   plural delay elements for delaying the multi-bit digital signal, which has been obtained by the A/D converter, at predetermined intervals;
   plural multipliers which are provided adaptively to the delay elements, respectively, each multiplier receiving the multi-bit digital signal or an output of the respective delay element as a first input, receiving a filter coefficient which has been controlled by the filter coefficient learning means as a second input, and multiplying the first input by the second input; and
   an addition means for adding outputs from the plural multipliers.

3. The optical disc playback apparatus of claim 1 comprising:
   holding registers which can each hold a value, wherein each holding register is paired with a respective initial-value register; and
   third selectors each receiving an output from a holding register and an output from an initial-value register of a respective pair of initial-value register and holding register, and selecting one of the signals from the holding register and the initial-value register of the respective pair in accordance with the switch signal, to output a selected signal.

* * * * *